United States Patent
Slikkerveer et al.

(10) Patent No.: US 7,710,370 B2
(45) Date of Patent: May 4, 2010

(54) FLEXIBLE DISPLAY DEVICE ROLLABLE BETWEEN ROLLED-UP AND UNROLLED STATES

(75) Inventors: Peter Jan Slikkerveer, Eindhoven (NL); Bas Jan Emile Van Rens, Eindhoven (NL)

(73) Assignee: Polymer Vision Limited, Eindhoven (NL)

( * ) Notice: Subject to any disclaimer, the term of this patent is extended or adjusted under 35 U.S.C. 154(b) by 541 days.

(21) Appl. No.: 10/535,470

(22) PCT Filed: Oct. 27, 2003

(86) PCT No.: PCT/IB03/04814

§ 371 (c)(1), (2), (4) Date: May 17, 2005

(87) PCT Pub. No.: WO2004/047059

PCT Pub. Date: Jun. 3, 2004

(65) Prior Publication Data

US 2006/0007368 A1    Jan. 12, 2006

(30) Foreign Application Priority Data

Nov. 21, 2002 (EP) ................................. 02079849
Aug. 28, 2003 (EP) ................................. 03103243

(51) Int. Cl.
*G09G 3/34* (2006.01)
(52) U.S. Cl. .......................................... 345/85; 345/31
(58) Field of Classification Search ............... 345/31, 345/32, 56, 85; 349/58; 361/681; 353/79
See application file for complete search history.

(56) References Cited

U.S. PATENT DOCUMENTS

| 4,221,292 | A | * | 9/1980 | Koebel ........................ 206/386 |
| 5,548,940 | A | * | 8/1996 | Baldock ........................ 53/430 |
| 6,216,490 | B1 | * | 4/2001 | Radley-Smith .................. 63/3 |
| 7,209,114 | B2 | * | 4/2007 | Radley-Smith .............. 345/156 |
| 2002/0030647 | A1 | * | 3/2002 | Hack et al. ..................... 345/82 |
| 2002/0070910 | A1 | | 6/2002 | Fujieda et al. |
| 2004/0052037 | A1 | * | 3/2004 | Sawyer ........................ 361/681 |

FOREIGN PATENT DOCUMENTS

| JP | 11272205 | 1/2000 |
| WO | WO 9212508 | 7/1992 |
| WO | WO 9959101 | 11/1999 |
| WO | WO 02073572 A2 | 9/2002 |

* cited by examiner

*Primary Examiner*—Chanh Nguyen
*Assistant Examiner*—Calvin C Ma
(74) *Attorney, Agent, or Firm*—Leydig, Voit & Mayer, Ltd.

(57) ABSTRACT

The invention relates to a display device assembly (1) comprising a flexible display device (2) being rollable around an axis (5), the flexible display (2) having a front side (3) and a back side (4), one of the sides (3,4) being provided with distance elements (7, 7',80) for preventing a direct contact between the front side (3) and the back side (4). By preventing the front and back side to contact each other the amount of display damage is significantly reduced as compared to conventional roll-up displays. An advantageous embodiment comprises a display device assembly in which the spacer elements are shaped in the form of bars (7, 7'). In a further advantageous embodiment of the display assembly the distance elements comprise a protection foil (80).

14 Claims, 5 Drawing Sheets

FLEXIBLE DISPLAY DEVICE ROLLABLE BETWEEN ROLLED-UP AND UNROLLED STATES

Figure 1:
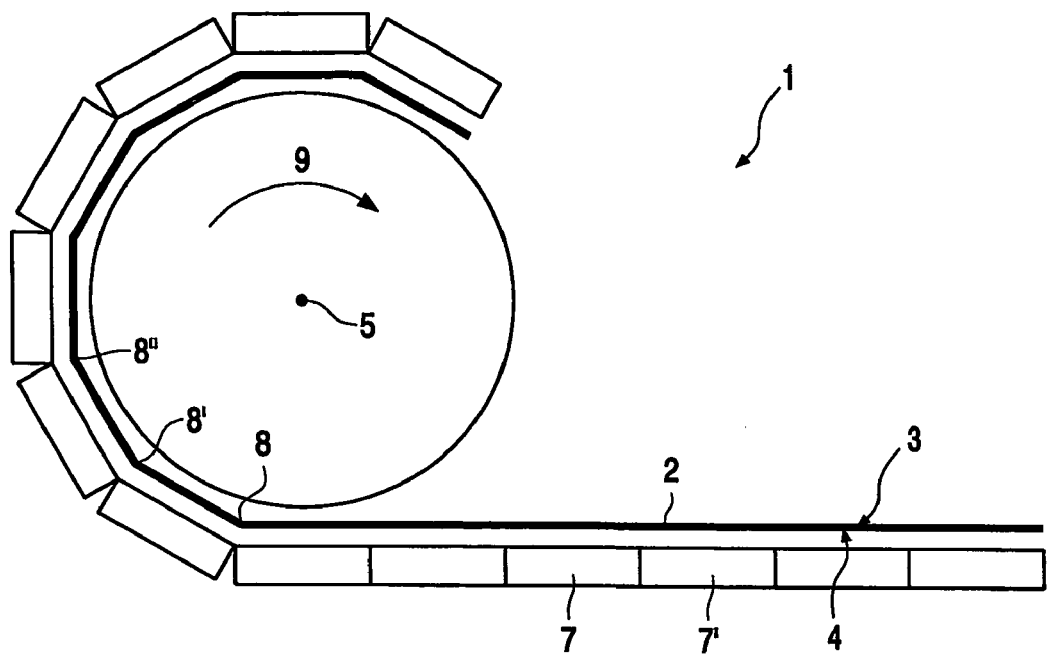

The invention is related to a display device assembly comprising a flexible display device being rollable around an axis, the flexible display having a front and a back side.

US-2002/0070910 discloses a flexible display device assembly comprising a flexible display device and a winding device to store the display in a housing. A user of the display assembly pulls the display from the housing to enjoy the content displayed on the display device. It is a problem that the display device is sensitive to indentation, scratching and tearing.

It is an aim of the invention to provide a display assembly in which the chance of damaging the display device is significantly reduced. To this end the display device assembly according to the invention is characterized in that one of the sides is provided with distance elements for preventing a direct contact between the front side and the back side.

The invention is based on the insight that damage to the conventional display is caused when the front and the back side of the display device make contact with each other. This happens during rolling-up of the display, and when the display is in the rolled-up state and is moved or transported. By preventing the front and back side to contact each other the amount of display damage is significantly reduced.

The dependent claims describe advantageous embodiments of the invention.

These and other objects of the invention will be apparent from and elucidated with reference to the embodiments described hereinafter.

Figure 2A:
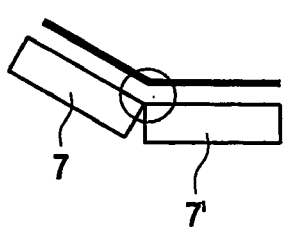
Figure 2B:
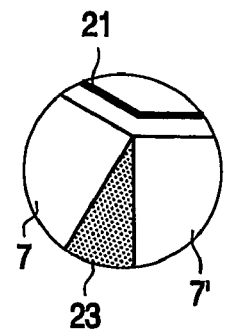
Figure 2C:
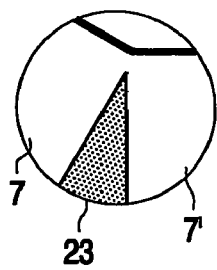
Figure 2D:
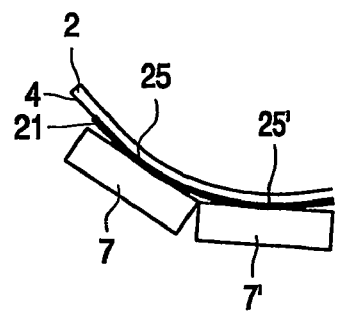
Figure 3:
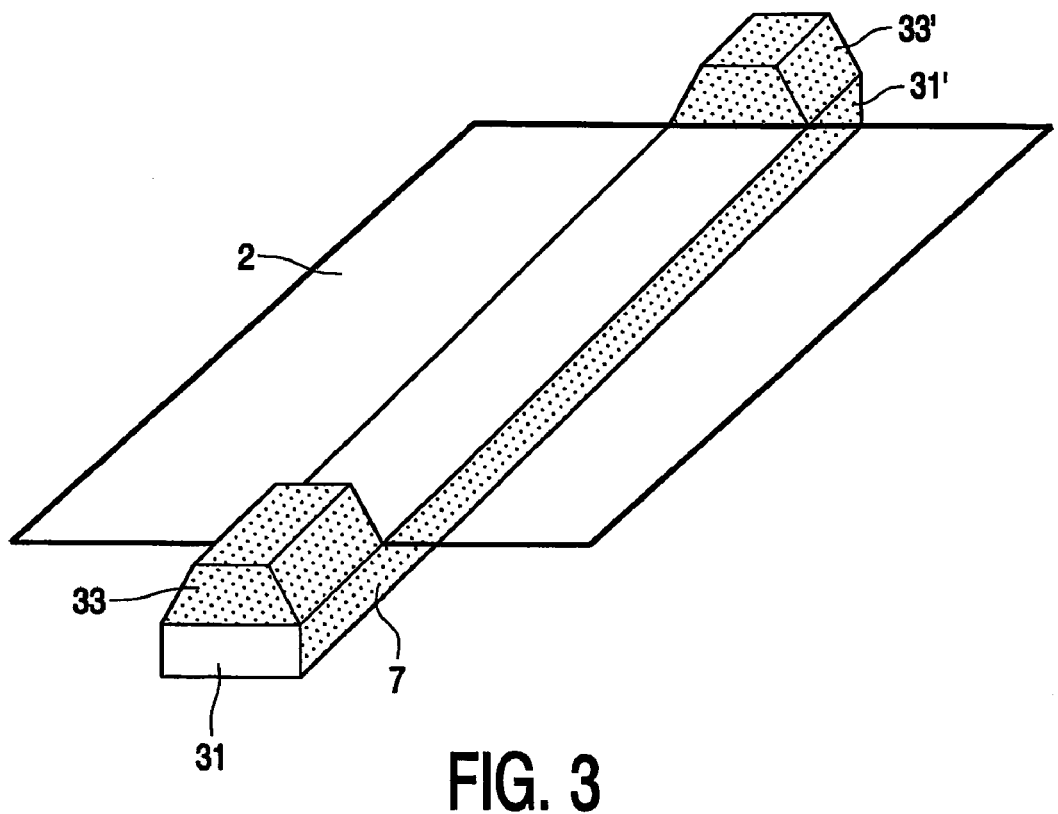
Figure 4:
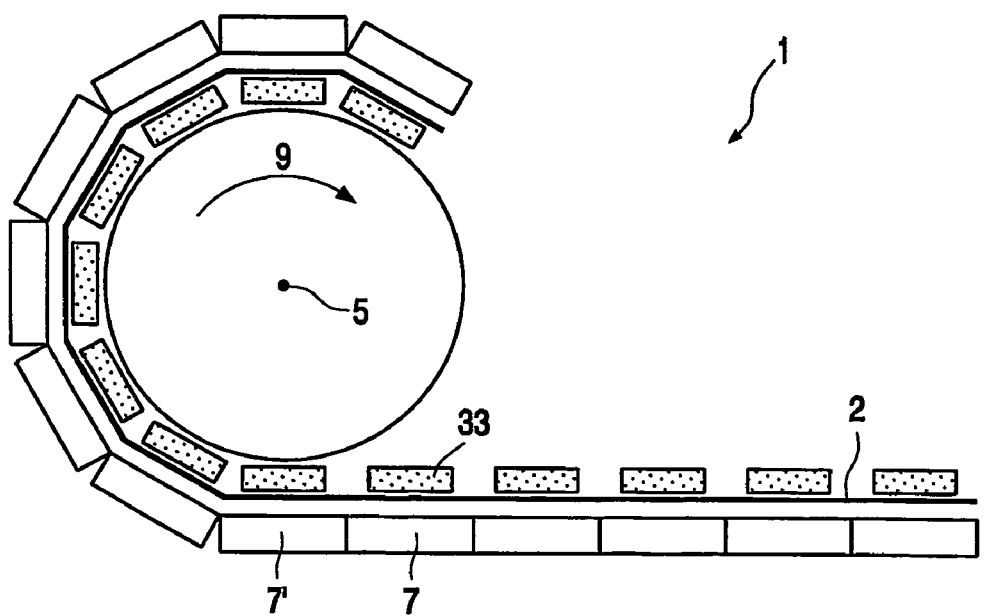
Figure 5:
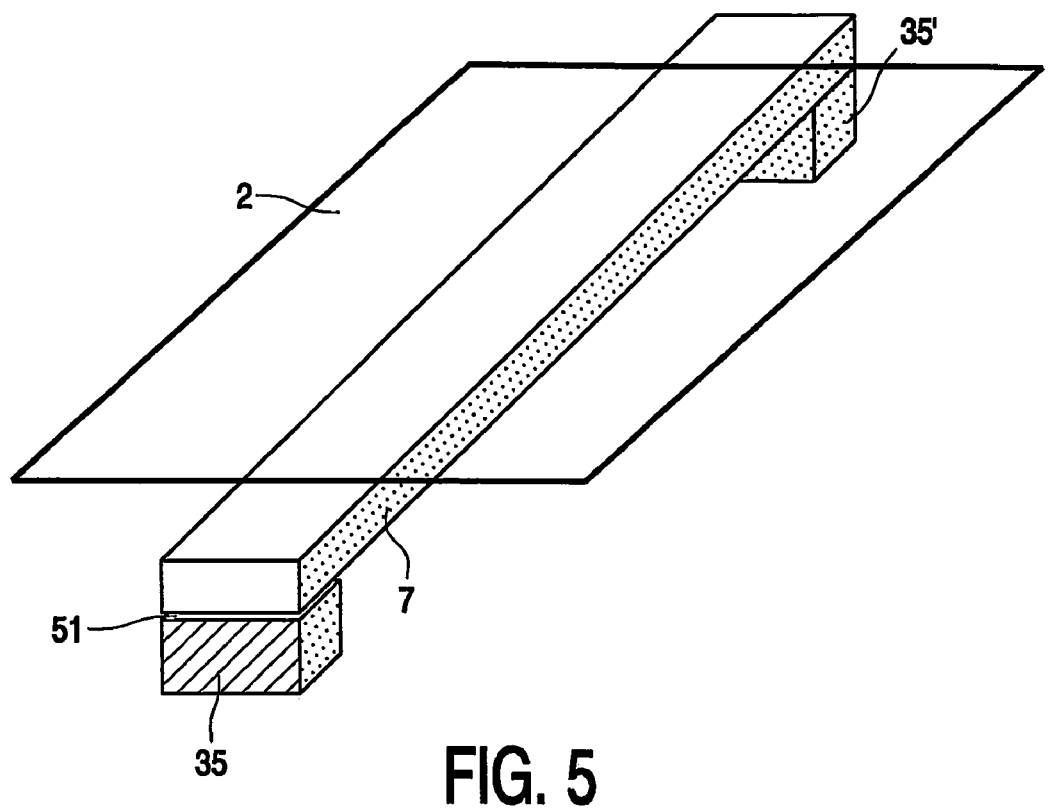
Figure 7:
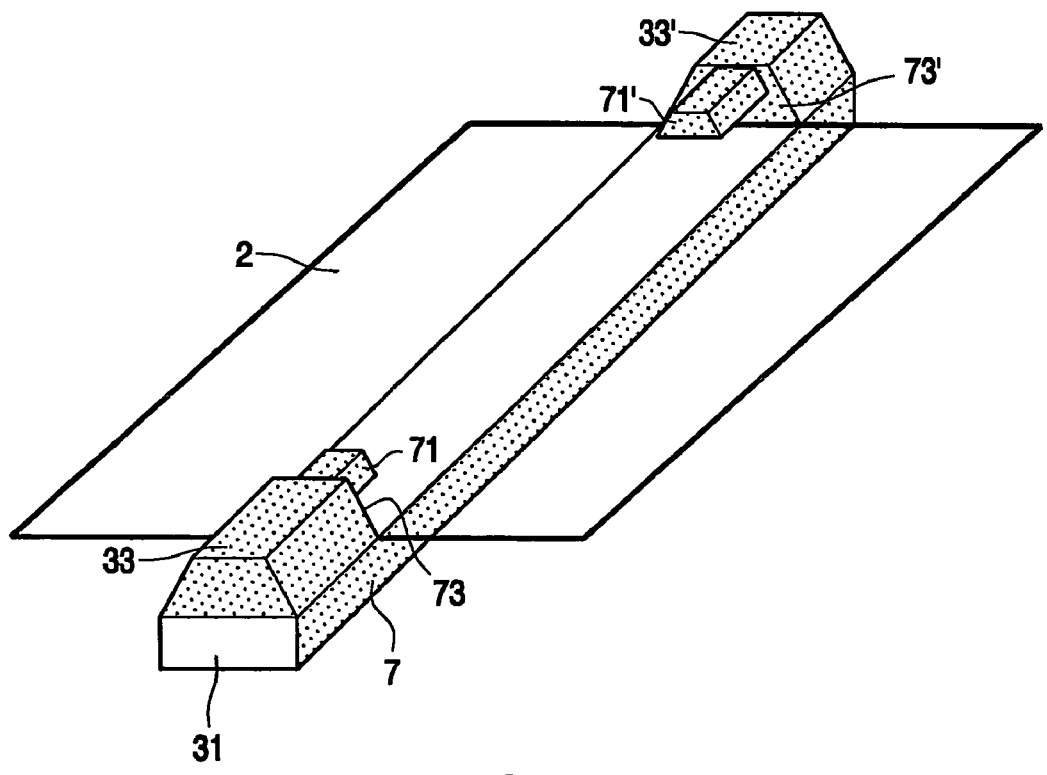
Figure 6:
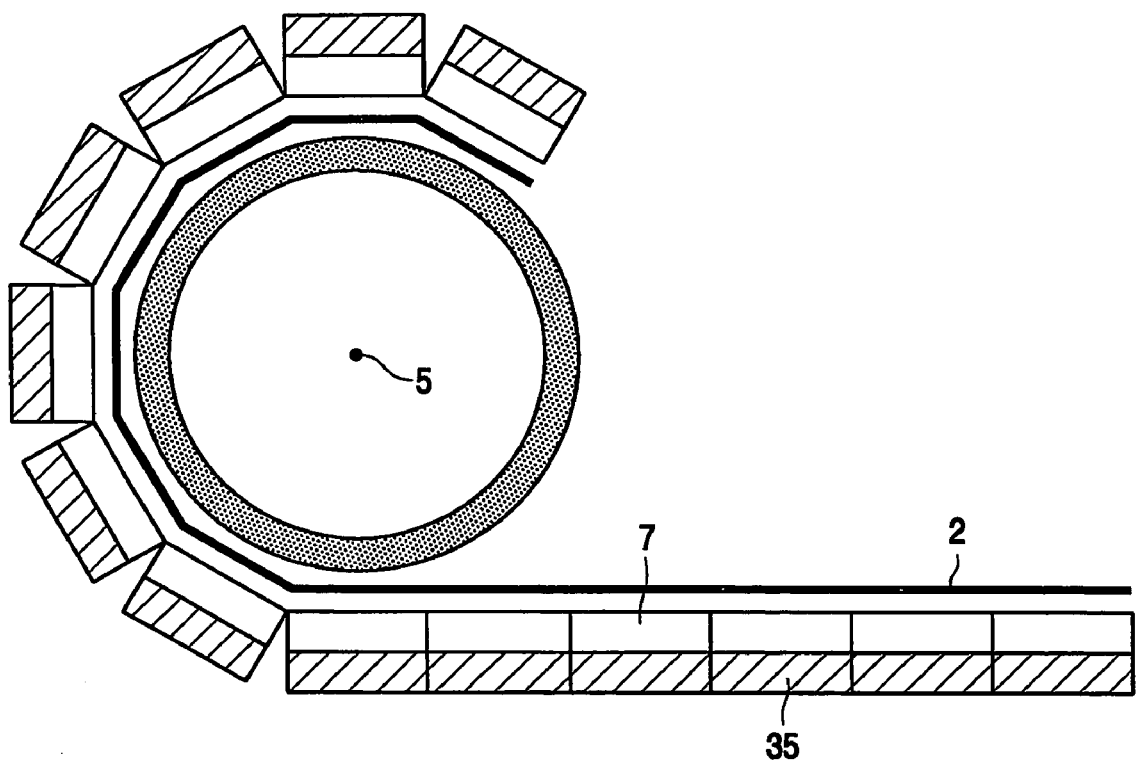
Figure 8:
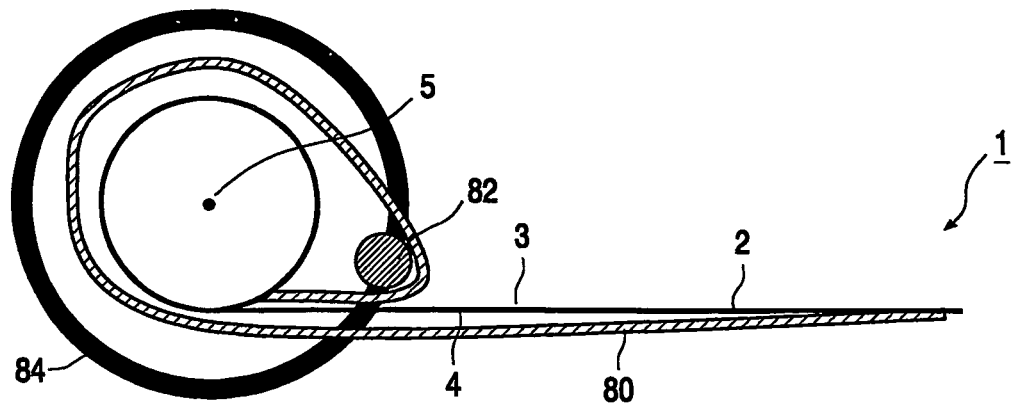
Figure 9:
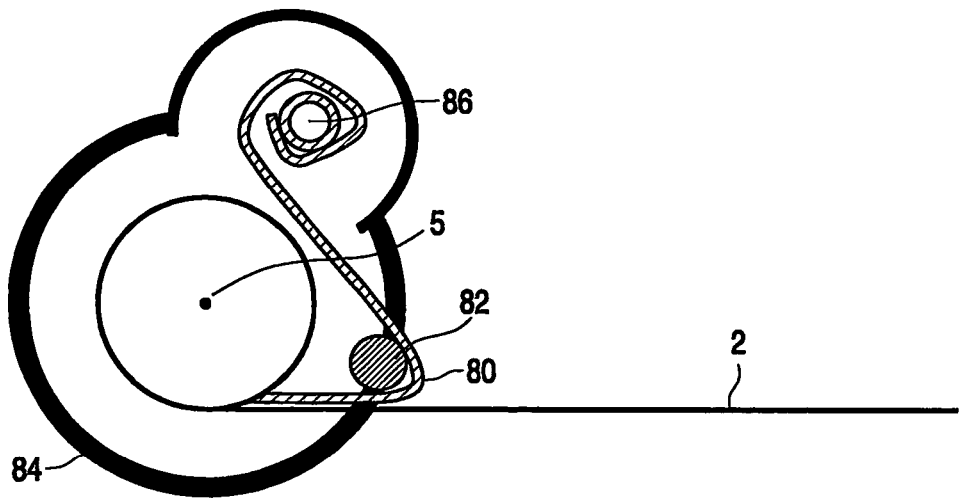
Figure 10:
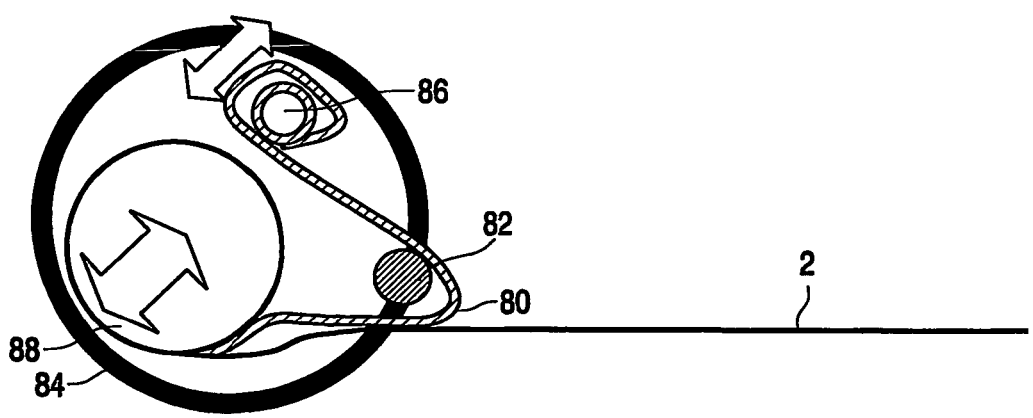

In the drawings:

FIG. 1 shows an embodiment of the flexible display assembly according to the invention, FIGS. 2A-2D illustrate a few embodiments of hinge mechanisms, FIG. 3 shows an embodiment of the invention wherein the distance elements are provided with outer portions, FIG. 4 shows a side view of the embodiment of FIG. 3, FIG. 5 shows another embodiment wherein a back side of the bars is provided with spacer blocks, FIG. 6 shows a side view of the embodiment of FIG. 5, and FIG. 7 shows an embodiment in which spacer blocks are provided with notches for receiving the display, FIG. 8 shows a side view of a further embodiment of the display assembly wherein the distance means comprise a protection foil, FIG. 9 shows a side view of an embodiment in which the protection foil is stored, FIG. 10 shows a side view of a further embodiment for storing the protection foil.

The figures are not drawn to scale. In the figures, like reference numerals generally refer to like parts.

Referring to FIG. 1, the display assembly according to the invention is shown. The display device assembly 1 comprises a flexible display device 2 being rollable around an axis 5. The flexible display device 2, e.g. of the LCD type, has a front side 3 and a back side 4. Both sides 3,4 comprise flexible sheets of plastic material. Due to its flexibility the display is rollable. This property enables e.g. an easy storing of the display assembly 1 when not in use. To prevent damage to the display device 2 occurring during rolling-up and/or when the display is in the rolled-up state, either the front side 3 or the back side 4 of the display is provided with distance elements 7, 7'. In the example shown in FIG. 1 the back side 4 of the display is provided with such distance elements, 7, 7'. Alternatively, distance means for preventing a direct contact between the front side 3 and the back side 4 may also be provided in the form of a separate foil.

The distance elements 7,7' prevent the occurrence of a direct contact between the front side 3 and the back side 4 of the display 2. Consequently, the amount of damage is significantly reduced as compared to the conventional display.

In the example shown in FIG. 1 the distance elements comprise bars 7, 7', but the invention is not limited to this particular shape. Distance elements 7, 7' having the shape of bars and being positioned so as to induce bending lines 8,8' in the flexible display device that are oriented substantially parallel to the axis 5 have the advantage that a very effective protection against damage is obtained. Further, the display may be easily rolled-up.

The bars 7, 7' may be positioned against each other such that rolling of the flexible display device may occur in only one direction, i.e. the direction necessary to roll it up indicated by the arrow 9. This eases the rolling-up of the display and allows a one-hand operation. In the unrolled state the back side is rigid and firmly supports the display.

A further advantageous embodiment of the display assembly according to the invention has bars 7, 7' that comprise transparent material and are mounted on the front side 3. In this case the viewer sees the display 2 through the bars, this is advantageous if positioning of the bars on the back side 4 is not possible or not preferred.

In FIG. 2A a hinge function is shown in the circle. FIG. 2B is an enlarged view of a first way of creating a hinge function between the subsequent bars: in this example the hinge function is provided by adding a layer of a flexible material 21 that is positioned between the bars 7 and the back side 4 of the display. The additional flexible layer 21 may be integrated with the flexible display itself. The flexible layer may comprise a, e.g., polyimide flexfoil containing electrically conductive patterns. The flexible layer may be fixed to the display device. The bars may contain electric or electronic components.

FIG. 2C shows an enlarged view of a second way of creating a hinge function. In this case it is the material of the bars 7 itself which is flexible. The material is provided with grooves 23 that are oriented substantially parallel to the axis. At the location of the grooves the flexible material is able to provide a hinge function. Alternatively, real hinges between the bars are also option.

FIG. 2D shows that in order to limit the deformation of the material during bending, the contact between the bars 7, 7' and the display 2 should preferably be limited to a center line 25, 25' (displayed in FIG. 2D as a single point, since the display is shown in side view) of the bars 7,7'.

A further advantageous embodiment of the display assembly is shown in FIG. 3. Here, a flexible display device assembly 1 has spacer elements with outer portions 31, 31'. The outer portions 31, 31' are provided with spacer blocks 33, 33' for creating a housing for storing the flexible display device when in the rolled-up state. Such a housing further protects the display against possible damage. To allow the display to be rolled-up the spacer blocks have a taper.

FIG. 4 shows a side view of the embodiment shown in FIG. 3. The spacer blocks 33,33' in combination with the bars 7, 7' provide a protective housing for the display 2, when in the rolled-up state.

FIG. 5 shows an embodiment of the display device wherein the bars 7, 7' have aback side 51, and wherein spacer blocks 35,35' are added to the back side 51 of the bars, resulting in a stiffer structure when the display 2 is rolled out.

FIG. 6 provides a side view of the embodiment shown in FIG. 5

FIG. 7 shows an embodiment of the display assembly according to the invention, wherein the bars 7 comprise spacer blocks 33, 33' positioned at a side opposite to the back side 51. The spacer blocks 33, 33' have a display side 73, 73'. The display side 73, 73' of the spacer blocks 33, 33' is provided with notches 71, 71' for receiving the flexible display device 2. In this way the display 2 is loosely attached to the bars 7, 7' and there is no need to fix the display to a separate flexible layer.

Distance means comprising bars 7,7' have the disadvantage that for obtaining a proper protection, the bars must have a sizeable thickness. However, in the case of rolling a display with a considerable length this will lead to a relatively thick roll.

FIG. 8 shows a preferable embodiment of the display assembly 1 wherein the distance means comprise a protection foil 80.

In this embodiment the protection foil is rolled up together with the display, thereby protecting the display surface in the rolled-up state and during unrolling. When unrolled the protection film is placed behind the display, where it supplies mechanical protection to the display.

The protection foil 80 preferably has a soft surface that touches the display surface to protect damage of the front side 3. Due to its softness the foil embeds hard particles that otherwise might damage the display surface by indentation and/or scratching.

To further improve the display assembly 1 it may be provided with a housing 84 in which the assembly is stored when not in use. The housing reduces the vulnerability with respect to damage of the assembly when being in the rolled-up state.

The protection foil 80 is rolled-up together with the display, and it also unrolls with the display when this is unrolled for use. Since the front side 3 of the display needs to be uncovered when the assembly is unrolled, the unrolled protection foil 9 has to be stored. One option is shown in FIG. 8, where the protection film, being connected to a rim of the backside of the display, after leaving the housing 84 is returned into the housing via a cylindrically shaped element that guides the protection foil 80. The protection foil is subsequently wound around the part of the display that is inside the housing 84. This embodiment has the advantage that no additional storage means for the protection foil 80 are needed.

Alternatively, the protection foil 80 may be rolled-up in the same housing 84 that houses the display assembly 1. To enable this either some extra space needs to be reserved within the housing (FIG. 9). Or an additional degree of freedom for allowing a translational movement of cylindrically shaped elements on which the foil and display are wound 86,88, inside the housing may be introduced (FIG. 10). In the latter embodiment, the cylinder 88 around which the display is rolled, moves with respect to the housing (in the direction indicated by the arrows) when the length of the display stored on the cylinder decreases. Thus more space is created for rolling the protection film on the storage cylinder 86.

In summary, the invention relates to a display device assembly 1 comprising a flexible display device 2 being rollable around an axis 5, the flexible display 2 having a front side 3 and a back side 4, one of the sides being provided with distance elements 7, 7', 80 for preventing a direct contact between the front side 3 and the back side 4. By preventing the front and back side to contact each other the amount of display damage is significantly reduced as compared to conventional roll-up displays. An advantageous embodiment comprises a display device assembly in which the distance elements are shaped in the form of bars 7, 7'. In a further advantageous embodiment of the display assembly the distance elements comprise a protection foil 80.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim. The word "a" or "an" preceding an element does not exclude the presence of a plurality of such elements.

The invention claimed is:

1. A display device assembly comprising:
    a flexible display being rollable around an axis, between a rolled-up and an unrolled state, the flexible display having a front side and a back side,
    distance elements provided on one of the sides of the flexible display for preventing a direct contact between the front side and the back side of the flexible display, the distance elements comprising bars positioned to extend substantially parallel to the axis, and
    a continuous layer of flexible material positioned between the bars and the back side of the flexible display, and wherein the continuous layer of flexible material is integrated with the flexible display to create hinges between adjacent ones of the bars such that, in the unrolled state of the flexible display, abutting sides of adjacent ones of the bars provide a stiffened support structure for the flexible display.

2. A display device assembly according to claim 1, wherein the bars are provided in the form of a piece of material having grooves oriented substantially parallel to the axis and that facilitate formation of the hinges between adjacent ones of the bars.

3. A display device assembly according to claim 1, wherein outer portions of the bars comprise spacers for creating a housing for the flexible display device in the rolled-up state.

4. A display device assembly according to claim 3, wherein the spacers are formed by spacer blocks that are positioned on a back side of the bars.

5. A display device assembly according to claim 4, wherein each spacer block has a display side that is provided with a notch for receiving the flexible display device.

6. A display device assembly according to claim 1, wherein the material of the bars is flexible.

7. A display device assembly comprising:
    a flexible display being rollable around at least one axis between a rolled-up and an unrolled state, the flexible display having a front side and a back side, and
    a distance element for preventing a direct contact between the front side and the back side of the flexible display in the rolled up state, and the distance element comprising a protection foil that is:
        mechanically coupled to roll and unroll with the flexible display,
        positioned against the flexible display in the rolled-up state, and
        unconnected over a surface area to the flexible display, thereby allowing separate movement of the protection foil and the flexible display when not in the rolled-up state; and
    the protection foil further having a soft surface that touches the front side of the flexible display in the rolled-up state.

8. A display device assembly according to claim 7 wherein the protection foil is connected to the back side of the display.

9. A display device assembly according to claim 7, wherein the display device assembly further comprises guiding means for guiding the protection foil when the assembly is being rolled into the unrolled state, such that the front side of the flexible display is not covered by the protection foil.

10. A display device assembly according to claim 9, wherein the protection foil is connected to a rim of the back side of the flexible display.

11. A display device assembly according to claim 9, wherein the display assembly is further provided with storing means for storing the protection foil, when the flexible display is in the unrolled state.

12. A flexible display device assembly according to claim 11, wherein the storing means comprise a cylindrical element for winding the protection foil around the cylindrical element.

13. A flexible display device assembly according to claim 11, wherein the storing means is arranged to enable a translational movement with respect to a housing.

14. A flexible display device assembly according to claim 9, wherein the flexible display device assembly is provided with a cylindrical element for winding the display around the cylindrical element, said cylindrical element being arranged to be translatable with respect to a housing.

\* \* \* \* \*